United States Patent
Inoue et al.

(10) Patent No.: US 7,619,052 B2
(45) Date of Patent: Nov. 17, 2009

(54) BLADE FOR ELECTROPHOTOGRAPHIC APPARATUS

(75) Inventors: Shouji Inoue, Tsukuba (JP); Taku Hatanaka, Moriya (JP); Kenichi Mochizuki, Ushiku (JP); Mayuko Kodama, Ushiku (JP)

(73) Assignee: Canon Kasei Kabushiki Kaisha, Tsukuba-Shi, Ibaraki-Ken (JP)

( * ) Notice: Subject to any disclaimer, the term of this patent is extended or adjusted under 35 U.S.C. 154(b) by 86 days.

(21) Appl. No.: 11/387,685

(22) Filed: Mar. 24, 2006

(65) Prior Publication Data

US 2006/0229425 A1  Oct. 12, 2006

(30) Foreign Application Priority Data

Apr. 6, 2005  (JP) .............................. 2005-109747

(51) Int. Cl.
*C08G 18/42* (2006.01)
*C08G 18/40* (2006.01)
*C08G 18/30* (2006.01)
*C08G 18/64* (2006.01)
*G03G 21/00* (2006.01)

(52) U.S. Cl. ............................ 528/83; 528/48; 528/60; 528/65; 528/80; 528/85; 528/84; 399/350

(58) Field of Classification Search ................. 399/350; 528/85, 65, 48, 60, 80, 83, 84
See application file for complete search history.

(56) References Cited

U.S. PATENT DOCUMENTS

| | | | | |
|---|---|---|---|---|
| 3,779,794 A | * | 12/1973 | De Santis | 428/422.8 |
| 5,866,667 A | | 2/1999 | Suzuki et al. | 528/52 |
| 6,002,911 A | * | 12/1999 | Suzuki et al. | 399/350 |
| 6,703,472 B2 | | 3/2004 | Miura et al. | |
| 2002/0192430 A1 | * | 12/2002 | Miura et al. | 428/157 |

FOREIGN PATENT DOCUMENTS

JP  8-281837  10/1996

* cited by examiner

*Primary Examiner*—James J. Seidleck
*Assistant Examiner*—Benjamin Gillespie
(74) *Attorney, Agent, or Firm*—Fitzpatrick, Cella, Harper & Scinto

(57) ABSTRACT

A blade for electrophotographic apparatus which has a blade member formed of a polyurethane resin, wherein the polyurethane resin is a resin produced by using a polyurethane raw-material composition containing at least the following components (A) to (E): (A) a polyisocyanate; (B) a polyol having a number average molecular weight of 2,000 or more and 4,000 or less; (C) a chain extender having a molecular weight of 200 or less: (D) a polyol having a number average molecular weight which is smaller than the number average molecular weight of the component-(B) polyol and is larger than the molecular weight of the component-(C) chain extender; and (E) a urethane curing catalyst.

2 Claims, No Drawings

US 7,619,052 B2

BLADE FOR ELECTROPHOTOGRAPHIC APPARATUS

BACKGROUND OF THE INVENTION

1. Field of the Invention

This invention relates to a blade for electrophotographic apparatus which is used in electrophotographic apparatus.

2. Related Background Art

In general, electrophotographic apparatus are provided with various blades such as a cleaning blade for removing a toner remaining on a photosensitive member after developer images have been transferred to a recording sheet and a developing blade which forms a toner thin layer while triboelectrically charging a toner held on a developing sleeve in a developing assembly. These blades are usually constituted of a support and joined thereto a blade member formed using an elastic member.

The cleaning blade is manufactured in such a way that the blade member prepared using an elastic member is set integral to a leaf edge portion of a support member such as a holder made of a metal; the holder being used to attach the cleaning blade to an electrophotographic apparatus. As the blade member, one formed using a polyurethane resin is usually used because of its superior wear resistance and compression set.

The polyurethane resin is produced by a prepolymer method, a semi-one-shot method or a one-shot method, using a polyisocyanate, a polyol, a chain extender and a catalyst.

For example, where the blade member is manufactured by the prepolymer method, it is manufactured by preparing a prepolymer by using a polyisocyanate and a polyol, adding the chain extender and the catalyst to the prepolymer, and thereafter casting the resultant material into a mold for molding, followed by curing. The time taken after the material is casted into the mold and until it is cured and released from the mold, i.e., the curing time influences manufacturing efficiency greatly. If the curing time is long, the mold must be made ready in a large number, and this requires an enormous investment. Accordingly, studies are made in variety so as to shorten the curing time.

In an attempt to shorten the curing time by enlarging the quantity of a catalyst, using a catalyst capable of accelerating urethanation as exemplified by triethylenediamine or dimethylimidazole, conventionally used in general purposes, the curing reaction takes place faster immediately after mixing of the catalyst, with an increase of the catalyst, to make the liquid material highly viscous. Hence, the liquid material does not spread throughout the mold, resulting in an insufficient flowability. Also, the liquid material may cure in a mixing chamber of a molding machine and may be casted in the state a urethane sediment has mixed in the liquid material, to cause a problem that foreign matters mix in the molded product.

Accordingly, to solve these problems, a highly temperature-sensitive isocyanurating catalyst is often used which little shows its activity until the liquid temperature reaches a stated temperature, and makes the curing reaction proceed rapidly after the liquid temperature has become higher than the stated temperature (see, e.g., Japanese Patent Application Laid-open No. H08-281837).

The use of the isocyanurating catalyst brings an improvement in flowability to mold. However, when cured, if a polyol having a number average molecular weight of 1,500 to 3,000 and a chain extender having a molecular weight of 300 or less are used in combination, the reaction tends to come non-uniform because of a too great difference in molecular weight between them. Also, since the reaction proceeds rapidly at a stated temperature or more, the reaction tends to come non-uniform, so that the molded product may come strained or a surface pattern may be caused by the non-uniformity of shrinkage. There have been such problems.

SUMMARY OF THE INVENTION

An object of the present invention is to provide a blade for electrophotographic apparatus which blade is formed using a polyurethane raw-material composition having a good flowability to mold, and which has a blade member free of surface defects such as a concave pattern caused by the shrinkage non-uniformity, has a superior quality and promises a high production efficiency.

The blade for electrophotographic apparatus according to the present invention, having solved the above problems is a blade for electrophotographic apparatus which has a blade member formed of a polyurethane resin, wherein the polyurethane resin is a resin produced by using a polyurethane raw-material composition containing at least the following components (A) to (E):

(A) a polyisocyanate;

(B) a polyol having a number average molecular weight of 2,000 or more and 4,000 or less;

(C) a chain extender having a molecular weight of 200 or less:

(D) a polyol having a number average molecular weight which is smaller than the number average molecular weight of the component-(B) polyol and is larger than the molecular weight of the component-(C) chain extender; and (E) a urethane curing catalyst.

Further, it is preferable that the ratio of the weight of the component-(B) polyol to the weight of the component-(D) polyol, (D)/(B), which components are contained in the polyurethane raw-material composition, is 0.02 or more and 0.25 or less and that the number average molecular weight of polyols for the component-(B) polyol and the component-(D) polyol in total is 1,500 or more and 3,000 or less.

It is also preferable that the polyurethane raw-material composition has an isocyanate group concentration (mmol/g) of 1.80 or more and 2.63 or less as calculated according to the following expression (1):

$$\mathrm{NCO} = 1{,}000 \times F_n \times W_{iso} / (Mn_{iso} \times W_{all}) \tag{1}$$

where NCO represents the isocyanate group concentration (mmol/g); $F_n$, the number of isocyanate groups per molecule of the component-(A) polyisocyanate; $W_{iso}$, the amount (g) in which the component-(A) polyisocyanate is mixed; $Mn_{iso}$, the number average molecular weight of the component-(A) polyisocyanate; and $W_{all}$, the total weight (g) of the components (A) to (E).

It is still also preferable that the component-(E) urethane curing catalyst comprises an isocyanurating catalyst or an allophanating catalyst.

DESCRIPTION OF THE PREFERRED EMBODIMENTS

The present invention is described below in detail.

The present invention is, in a blade for electrophotographic apparatus which has a blade member formed of a polyurethane resin, characterized in that the polyurethane resin is a resin produced by using a polyurethane raw-material composition containing at least the following components (A) to (E):

(A) a polyisocyanate;

(B) a polyol having a number average molecular weight of 2,000 or more and 4,000 or less;

(C) a chain extender having a molecular weight of 200 or less:

(D) a polyol having a number average molecular weight which is smaller than the number average molecular weight of the component-(B) polyol and is larger than the molecular weight of the component-(C) chain extender; and (E) a urethane curing catalyst.

The blade for electrophotographic apparatus according to the present invention is a blade used as a cleaning blade, a developing blade or the like for electrophotographic apparatus to which electrophotographic techniques are applied, such as copying machines, laser beam printers, light-emitting diode printers (LED printers) and electrophotomechanical systems. It is so set up that the blade member formed of a polyurethane resin produced using the above polyurethane raw-material composition and a support member are joined together. The support member and blade member may have any shape suited for their use purposes, without any particular limitations.

As to materials constituting the support member, it may also be made of any material without any particular limitations, including metals and resins, stated more specifically, metallic materials such as steel sheets, stainless steel sheets, zinc-coated chromate film steel sheets and chromium-free steel sheets, and resin materials such as 6-nylon and 6,6-nylon.

The support member and the blade member may be joined together by any method without any particular limitations, and a suitable method may be selected from among known methods. Stated specifically, it may include, e.g., a method in which these are bonded together by using an adhesive such as a phenolic resin.

The component-(A) polyisocyanate to be mixed in the polyurethane raw-material composition may include, e.g., 4,4'-diphenylmethane diisocyanate (4,4'-MDI), isophorone diisocyanate (IPDI), 4,4'-dicyclohexylmethane diisocyanate (hydrogenated MDI), trimethylhexamethylene diisocyanate (TMHDI), tolylene diisocyanate (TDI), carbodiimide-modified MDI, polymethylene phenylpolyisocyanate (PAPI), orthotoluidine diisocyanate (TODI), naphthylene diisocyanate (NDI), xylene diisocyanate (XDI), hexamethylene diisocyanate (HMDI), paraphenylene diisocyanate (PDI), lysine diisocyanate methyl ester (LDI) and dimethyl diisocyanate (DDI). In particular, it is preferable to use 4,4'-MDI. A prepolymer obtained by beforehand reacting any of these polyisocyanates with the component-(B) polyol may also be used as the polyisocyanate.

The component-(B) polyol to be mixed in the polyurethane raw-material composition may include, as specific examples, adipate type polyesters such as polyethylene adipate ester polyol, polybutylene adipate ester polyol, polyhexylene adipate ester polyol, polyethylene-propylene adipate ester polyol, polyethylene-butylene adipate ester polyol and polyethylene-neopentylene adipate ester polyol. It may also include polycaprolactone type polyols such as polycaprolactone ester, obtained by ring-opening polymerization of caprolactone; and polyethers such as polyethylene glycol, polypropylene glycol and polytetramethylene glycol. Polycarbonate diols may also be used. Any of these may be used alone or in the form of a mixture of two or more types.

The component-(B) polyol to be mixed in the polyurethane raw-material composition is a polyol having a number average molecular weight of 2,000 or more and 4,000 or less. If a polyol having a number average molecular weight of less than 2,000 is used as the polyol, the whole polyol have a small number average molecular weight, and hence the polyurethane resin obtained tends to have low physical properties, undesirably. If on the other hand it has a number average molecular weight of more than 4,000, the difference in molecular weight from the component-(D) polyol to be used is so great that the effect of keeping the concave pattern from being caused may be small, undesirably.

As the component-(C) chain extender to be mixed in the polyurethane raw-material composition, a glycol may be used, for example. Such a glycol may include, e.g., ethylene glycol (EG), diethylene glycol (DEG), propylene glycol (PG), dipropylene glycol (DPG), 1,4-butanediol (1,4-BD), hexanediol (HD), 1,4-cyclohexanediol, 1,4-cyclohexanedimethanol, xylylene glycol(terephthalyl alcohol) and triethylene glycol. Besides the above glycols, other polyhydric alcohols may also be used. Such polyhydric alcohols may include, e.g., trimethyrolpropane, glycerol, pentaerythritol and sorbitol.

As the component-(C) chain extender, the one having a molecular weight of 200 or less is used. This is because, if the component-(C) chain extender has a molecular weight of more than 200, hard segments may less agglomerate to afford low physical properties.

The polyurethane raw-material composition contains the component-(D) polyol having a number average molecular weight which is smaller than the number average molecular weight of the component-(B) polyol and is larger than the molecular weight of the component-(C) chain extender. The introduction of the component-(D) polyol having a number average molecular weight intermediate between the component-(B) polyol and the component-(C) chain extender enables formation of molded products having no concave pattern which may be caused by shrinkage non-uniformity.

Where this component-(D) polyol is not contained, the reaction tends to come non-uniform because those having a too great difference in molecular weight that the component-(C) chain extender has a molecular weight of 200 or less and the component-(B) polyol has a number average molecular weight of 2,000 or more and 4,000 or less are reacted with the component-(A) polyisocyanate. If the isocyanurating catalyst is used in order to shorten the reaction time, it is so highly temperature-sensitive that the reaction proceeds rapidly, and hence the reaction tends to come more non-uniform. This may bring about the concave pattern caused by shrinkage non-uniformity. However, the introduction of the component-(D) polyol having a number average molecular weight which is smaller than the number average molecular weight of the component-(B) polyol and is larger than the molecular weight of the component-(C) chain extender makes the difference in molecular weight multi-stepwise, and hence, even when the temperature-sensitive catalyst is used and the reaction is rapid, has enabled the concave pattern not to be caused by shrinkage non-uniformity, as so presumed.

The component-(D) polyol may include polyesters such as polyethylene adipate ester polyol, polybutylene adipate ester polyol, polyhexylene adipate ester polyol, polyethylene-propylene adipate ester polyol, polyethylene-butylene adipate ester polyol and polyethylene-neopentylene adipate ester polyol. Any of these polyols may be used alone or in the form of a mixture of two or more types. Also usable are polyethers such as polyethylene glycol, polypropylene glycol and polytetramethylene glycol. Any of these may be used alone or in the form of a mixture of two or more types.

It is preferable that the ratio of the weight of the component-(B) polyol to the weight of the component-(D) polyol, (D)/(B), which components are contained in the polyurethane raw-material composition, is 0.02 or more and 0.25 or less. As long as it is 0.02 or more, the component-(D) polyol can effectively make multi-stepwise the difference in molecular weight between the component-(C) chain extender and the component-(B) polyol, and hence the effect of keeping the concave pattern from being caused by shrinkage non-uniformity is improved. Meanwhile, as long as this ratio is 0.25 or less, the ratio of the component-(D) polyol having a number average molecular weight smaller than the component-(B) polyol is so favorable that the polyurethane resin to be obtained can show a tendency to have high physical properties.

It is also preferable that the number average molecular weight of polyols for the component-(B) polyol and the component-(D) polyol in total is 1,500 or more and 3,000 or less. More specifically, as long as it is more than 1,500, the polyurethane resin to be obtained can be improved in physical properties. Also, as long as it is 3,000 or less, the prepolymer can have a low viscosity to enhance the flowability to mold.

As the component-(E) urethane curing catalyst to be mixed in the polyurethane raw-material composition, an isocyanurating catalyst, an allophanating catalyst, a urethanating catalyst and so forth are available. What contains the isocyanurating catalyst or the allophanating catalyst is preferred. What contains the both may also preferably be used.

The isocyanurating catalyst may include tertiary amines such as N-ethylpiperidine, N,N'-dimethylpiperadine and N-ethylmorphorine.

The catalyst capable of accelerating both the isocyanuration and the allophanation may include, e.g., hydroxides or organic weak acid salts of tetraalkylammoniums such as tetramethylammonium, tetraethylammonium and tetrabutylammonium; hydroxides or organic weak acid salts of hydroxyalkylammoniums such as trimethylhydroxypropylammonium and triethylhydroxypropylammonium; and any one of, or a mixture of any of, alkali metal salts of carboxylic acids such as acetic acid, propionic acid, butyric acid, caproic acid, capric acid, valeric acid, octylic acid, myristic acid and naphthenic acid. In particular, alkali metal salts of carboxylic acids are preferred, which do not cause blooming after molding to affect other component parts.

The urethanating catalyst may also be used in combination. As the urethanating catalyst, a polyurethane curing catalyst which is commonly used may be used, and may include, e.g., tertiary amine catalysts, as exemplified by amino-alcohols such as dimethylethanolamine, trialkylamines such as triethylamine, and tetraalkyldiamines such as N,N,N',N'-tetramethyl-1,3-butanediamine, as well as triethylenediamine, piperadine types and triazine types. A metallic catalyst usually used for urethane may also be used, as exemplified by dibutyltin dilaurate.

The component-(E) urethane curing catalyst may be mixed in the polyurethane raw-material composition at a level of 3 ppm or more and 1,000 ppm or less. As long as it is at a level of 3 ppm or more, the effect of accelerating the curing is obtainable. As long as it is at a level of 1,000 ppm or less, the effect of accelerating the curing is obtainable without damaging the flowability to mold.

There are no particular limitations on how to manufacture the blade for electrophotographic apparatus according to the present invention, and a suitable method may be selected from among known methods. For example, in the case of manufacturing the cleaning blade, the support member may be placed in a mold for cleaning blade, and thereafter the above polyurethane raw-material composition may be casted into a cavity, followed by heating to effect curing to obtain a cleaning blade having a platelike blade member and the support member which are set integral. A method may also be employed in which a polyurethane resin sheet is separately formed from the polyurethane raw-material composition by molding or extrusion, and this sheet is cut in the shape of an oblong card to prepare a blade member, where the blade member is superposed at its adherent portion, on the support member, having been coated with or stuck with an adhesive, and these are pressed with heating so as to be bonded together.

The present invention is described below by giving Examples. The present invention is by no means limited by these Examples.

EXAMPLE 1

Preparation of Thermosetting Polyurethane Raw-Material Composition 296.6 g of 4,4'-diphenylmethane diisocyanate (4,4'-MDI) and 666.4 g of polyethylene adipate (PEA) having a number average molecular weight of 2,400 were allowed to react at 80° C. for 3 hours to obtain a prepolymer having an NCO (%) of 7.62%. Also, to a mixture of 34.2 g of a chain extender 1,4-butanediol (1,4-BD), 18.4 g of a chain extender trimethylolpropane (TMP) and 37.0 g of polyethylene adipate (PEA) having a number average molecular weight of 500, 0.10 g of P15 (trade name; available from Air Products Japan, Inc.; an ethylene glycol (EG) solution of potassium acetate) and 0.53 g of triethylenediamine (TEDA) were added to ready a mixture containing urethane curing catalysts.

The prepolymer and the mixture containing the urethane curing catalyst were blended when molding was carried out, to prepare a polyurethane raw-material composition. In this polyurethane raw-material composition, the value of the ratio (D)/(B) of the mass of the polyethylene adipate (PEA) having a number average molecular weight of 2,400, corresponding to the component-(D) polyol, and the weight of the polyethylene adipate (PEA) having a number average molecular weight of 500, corresponding to the component-(B) polyol, was 0.06, and the number average molecular weight of polyols for these in total was 2,000. Also, the isocyanate group concentration calculated according to the expression (1) given previously was 2.25 mmol/g.

Molding of Cleaning Blades:

Holders were beforehand readied as support members, and the holders were coated at their leaf edges with a phenolic adhesive. In molds for molding cleaning blades, each constituted of an upper force and a bottom force, the holders thus coated were placed in the state their leaf edge portions coated with the adhesive projected into cavities, and then the above polyurethane raw-material composition was casted into the cavities. This composition was reacted and cured at a heating temperature of 130° C. while changing the heating time. Then, the cured products obtained were demolded to obtain cleaning blades.

On the flowability to mold, the curing time, the hardness, and the concave pattern of the blade member of each cleaning blade obtained, evaluation was made in the following way. Results obtained are shown in Table 1.

Flowability to Mold:

Cleaning blades obtained by molding through reaction and curing in 1 minute were visually observed to inspect whether or not any unfilled portions due to poor flowability were seen.

A: No unfilled portion was seen.

C: Unfilled portions were seen.

Curing Time:

The heating time in which blade members became demoldable without being deformed at the time of demolding was measured, and was regarded as the curing time.

Concave Pattern:

External appearance of a hundred cleaning blades obtained by molding through reaction and curing in 1 minute were visually observed, and the number of cleaning blade(s) on the blade member(s) of which the concave pattern was seen to have been caused was counted, and was evaluated according to the following criteria.

A: The number of those on which the concave pattern was seen was 0.

B: The number of those on which the concave pattern was seen was 1 or more and 30 or less.

C: The number of those on which the concave pattern was seen was 31 or more.

Hardness:

Cleaning blades obtained by molding through reaction and curing in 1 minute were further left at room temperature for a day, and the hardness (IRHD) of blade members of the resultant cleaning blades was measured with a Wallace microhardness meter, manufactured by H. W. Wallace & Co., Ltd., according to JIS K 6253.

EXAMPLE 2

Cleaning blades were manufactured in the same manner as in Example 1 except that PEA having a number average molecular weight of 2,000 was used as the component-(B) polyol and that the amount in which this PEA was mixed and the amounts in which the 4,4'-MDI, the component-(D) polyol PEA and the urethane curing catalyst P15 were mixed were changed to the amounts shown in Table 1. Evaluation was made in the same way. Results obtained are shown in Table 1.

EXAMPLE 3

Cleaning blades were manufactured in the same manner as in Example 1 except that PEA having a number average molecular weight of 4,000 was used as the component-(B) polyol and that the amount in which this PEA was mixed and the amounts in which the 4,4'-MDI, the chain extenders 1,4-BD and TMP, the component-(D) polyol PEA and the urethane curing catalyst P15 were mixed were changed to the amounts shown in Table 1. Evaluation was made in the same way. Results obtained are shown in Table 1.

EXAMPLE 4

Cleaning blades were manufactured in the same manner as in Example 1 except that PEA having a number average molecular weight of 200 was used as the component-(D) polyol and that the amount in which this PEA was mixed and the amounts in which the component-(B) polyol PEA and the urethane curing catalyst P15 were mixed were changed to the amounts shown in Table 1. Evaluation was made in the same way. Results obtained are shown in Table 1.

EXAMPLE 5

Cleaning blades were manufactured in the same manner as in Example 1 except that PEA having a number average molecular weight of 1,200 was used as the component-(D) polyol and that the amount in which this PEA was mixed and the amounts in which the component-(B) polyol PEA and the urethane curing catalyst P15 were mixed were changed to the amounts shown in Table 2. Evaluation was made in the same way. Results obtained are shown in Table 2.

EXAMPLE 6

Cleaning blades were manufactured in the same manner as in Example 1 except that the amounts in which the component-(B) polyol PEA and the component-(D) polyol PEA were mixed were changed to the amounts shown in Table 2 and the number average molecular weight of whole polyols for the component-(B) and -(D) polyols in total was so made as to be 1,600, and that the amounts in which the 4,4'-MDI and the urethane curing catalyst P15 were mixed were changed to the amounts shown in Table 2. Evaluation was made in the same way. Results obtained are shown in Table 2.

EXAMPLES 7 AND 8

Cleaning blades were manufactured in the same manner as in Example 1 except that the amounts in which the 4,4'-MDI, the component-(B) polyol PEA, the component-(D) polyol PEA, the chain extenders 1,4-BD and TMP and the urethane curing catalyst P15 were mixed were changed to the amounts shown in Table 2. Evaluation was made in the same way. Results obtained are shown in Table 2.

Comparative Example 1

Cleaning blades were manufactured in the same manner as in Example 1 except that PEA having a number average molecular weight of 5,000 was used as the component-(B) polyol and that the amount in which this PEA was mixed and the amounts in which the component-(D) polyol PEA and the urethane curing catalyst P15 were mixed were changed to the amounts shown in Table 3. Evaluation was made in the same way. Results obtained are shown in Table 3.

Comparative Example 2

Cleaning blades were manufactured in the same manner as in Example 1 except that PEA having a number average molecular weight of 1,800 was used as the component-(B) polyol and that the amount in which this PEA was mixed and the amounts in which the component-(D) polyol PEA, the 4,4'-MDI, the chain extenders 1,4-BD and TMP and the urethane curing catalyst P15 were mixed were changed to the amounts shown in Table 3. Evaluation was made in the same way. Results obtained are shown in Table 3.

Comparative Example 3

Cleaning blades were manufactured in the same manner as in Example 1 except that PEA having a number average molecular weight of 2,000 was used as the component-(B) polyol, that the amount in which this PEA was mixed and the amount in which the urethane curing catalyst P15 was mixed were changed to the amounts shown in Table 3 and that the component-(D) polyol was not used. Evaluation was made in the same way. Results obtained are shown in Table 3.

Comparative Example 4

Cleaning blades were manufactured in the same manner as in Example 1 except that the component-(E) urethane curing catalyst was not used. Evaluation was made in the same way. Results obtained are shown in Table 3.

TABLE 1

|  |  | Example | | | |
|---|---|---|---|---|---|
|  |  | 1 | 2 | 3 | 4 |
| (A) Polyisocyanate | Type: | 4,4'-MDI | 4,4'-MDI | 4,4'-MDI | 4,4'-MDI |
|  | Amount: (g) | 296.6 | 305.2 | 297.0 | 296.6 |
| (B) Polyol | Type: | PEA | PEA | PEA | PEA |
|  | Number average molecular weight: | 2,400 | 2,000 | 4,000 | 2,400 |
|  | Amount: (g) | 666.4 | 669.1 | 669.5 | 690.6 |
| (C) Chain extender (1) | Type: | 1,4-BD | 1,4-BD | 1,4-BD | 1,4-BD |
|  | Molecular weight: | 90.1 | 90.1 | 90.1 | 90.1 |
|  | Amount: (g) | 34.2 | 34.2 | 39.1 | 34.2 |
| (C) Chain extender (2) | Type: | TMP | TMP | TMP | TMP |
|  | Molecular weight: | 134.2 | 134.2 | 134.2 | 134.2 |
|  | Amount: (g) | 18.4 | 18.4 | 21.0 | 18.4 |
| (D) Polyol | Type: | PEA | PEA | PEA | PEA |
|  | Number average molecular weight: | 500 | 500 | 500 | 200 |
|  | Amount: (g) | 37.0 | 25.7 | 33.5 | 12.8 |
| (E) Urethane curing catalyst: | Type: | P15 | P15 | P15 | P15 |
| Isocyanurating catalyst, allophanating catalyst | Amount: (g) | 0.10 | 0.05 | 0.05 | 0.05 |
| Urethanating catalyst | Type: | TEDA | TEDA | TEDA | TEDA |
|  | Amount: (g) | 0.53 | 0.53 | 0.53 | 0.53 |
| (D)/(B): |  | 0.06 | 0.04 | 0.05 | 0.02 |
| Number average molecular weight of (D) and (B) polyols in total: |  | 2,000 | 1,700 | 3,000 | 2,000 |
| Isocyanate group concentration: (mmol/g) |  | 2.25 | 2.32 | 2.24 | 2.25 |
| Flowability to mold: |  | A | A | A | A |
| Curing time: (minute) |  | 1 | 1 | 1 | 1 |
| Concave pattern: |  | A | A | A | A |
| Hardness: (degree) |  | 70 | 68 | 71 | 70 |

TABLE 2

|  |  | Example | | | |
|---|---|---|---|---|---|
|  |  | 5 | 6 | 7 | 8 |
| (A) Polyisocyanate | Type: | 4,4'-MDI | 4,4'-MDI | 4,4'-MDI | 4,4'-MDI |
|  | Amount: (g) | 296.6 | 315.6 | 262.1 | 349.5 |
| (B) Polyol | Type: | PEA | PEA | PEA | PEA |
|  | Number average molecular weight: | 2,400 | 2,400 | 2,400 | 2,400 |
|  | Amount: (g) | 562.7 | 594.3 | 699.0 | 616.2 |
| (C) Chain extender (1) | Type: | 1,4-BD | 1,4-BD | 1,4-BD | 1,4-BD |
|  | Molecular weight: | 90.1 | 90.1 | 90.1 | 90.1 |
|  | Amount: (g) | 34.2 | 34.2 | 27.8 | 43.9 |
| (C) Chain extender (2) | Type: | TMP | TMP | TMP | TMP |
|  | Molecular weight: | 134.2 | 134.2 | 134.2 | 134.2 |
|  | Amount: (g) | 18.4 | 18.4 | 15.0 | 23.7 |
| (D) Polyol | Type: | PEA | PEA | PEA | PEA |
|  | Number average molecular weight: | 1,200 | 500 | 500 | 500 |
|  | Amount: (g) | 140.7 | 90.1 | 38.8 | 34.2 |
| (E) Urethane curing catalyst: | Type: | P15 | P15 | P15 | P15 |
| Isocyanurating catalyst, allophanating catalyst | Amount: (g) | 0.05 | 0.05 | 0.05 | 0.06 |
| Urethanating catalyst | Type: | TEDA | TEDA | TEDA | TEDA |
|  | Amount:(g) | 0.53 | 0.53 | 0.53 | 0.53 |
| (D)/(B): |  | 0.25 | 0.15 | 0.06 | 0.20 |
| Number average molecular weight of (D) and (B) polyols in total: |  | 2,000 | 1,600 | 2,000 | 2,000 |
| Isocyanate group concentration: (mmol/g) |  | 2.25 | 2.40 | 2.01 | 2.62 |
| Flowability to mold: |  | A | A | A | A |
| Curing time: (minute) |  | 1 | 1 | 2 | 1 |
| Concave pattern: |  | A | A | A | A |
| Hardness: (degree) |  | 70 | 67 | 67 | 71 |

TABLE 3

|  |  | Comparative Example | | | |
|---|---|---|---|---|---|
|  |  | 1 | 2 | 3 | 4 |
| (A) Polyisocyanate | Type: | 4,4'-MDI | 4,4'-MDI | 4,4'-MDI | 4,4'-MDI |
|  | Amount: (g) | 296.6 | 298.8 | 296.6 | 296.6 |
| (B) Polyol | Type: | PEA | PEA | PEA | PEA |
|  | Number average molecular weight: | 5,000 | 1,800 | 2,000 | 2,400 |
|  | Amount: (g) | 586.2 | 597.4 | 703.4 | 666.4 |
| (C) Chain extender (1) | Type: | 1,4-BD | 1,4-BD | 1,4-BD | 1,4-BD |
|  | Molecular weight: | 90.1 | 90.1 | 90.1 | 90.1 |
|  | Amount: (g) | 34.2 | 26.9 | 34.2 | 34.2 |
| (C) Chain extender (2) | Type: | TMP | TMP | TMP | TMP |
|  | Molecular weight: | 134.2 | 134.2 | 134.2 | 134.2 |
|  | Amount: (g) | 18.4 | 14.5 | 18.4 | 18.4 |
| (D) Polyol | Type: | PEA | PEA | none | PEA |
|  | Number average molecular weight: | 500 | 500 | none | 500 |
|  | Amount: (g) | 117.2 | 103.7 | none | 37.0 |
| (E) Urethane curing catalyst: Isocyanurating catalyst, allophanating catalyst | Type: Amount: (g) | P15 0.05 | P15 0.05 | P15 0.05 | none none |
| Urethanating catalyst | Type: | TEDA | TEDA | TEDA | TEDA |
|  | Amount: (g) | 0.53 | 0.53 | 0.53 | 1.50 |
| (D)/(B): |  | 0.20 | 0.17 | 0 | 0.06 |
| Number average molecular weight of (D) and (B) polyols in total: |  | 2,000 | 1,300 | 2,000 | 2,000 |
| Isocyanate group concentration: (mmol/g) |  | 2.25 | 2.29 | 2.25 | 2.25 |
| Flowability to mold: |  | A | A | A | B |
| Curing time: (minute) |  | 1 | 1 | 1 | 10 |
| Concave pattern: |  | B | B | C | A |
| Hardness: (degree) |  | 68 | 63 | 68 | 79 |

As can be seen from Tables 1 and 2, in Examples 1 to 8, there is no problem on the flowability to mold, the curing time is within 2 minutes, and no concave pattern comes about. On the other hand, as can be seen from Table 3, in Comparative Examples 1 and 2, the number average molecular weight of the component-(B) polyol is outside the range of the number average molecular weight in the present invention, and, in Comparative Example 3, the component-(D) polyol is not used, and hence the concave pattern comes about. In Comparative Example 4, no urethane curing catalyst is used, and hence the curing time is so long as to be 10 minutes, resulting in a poor production efficiency.

As described above, according to the present invention, since the polyurethane raw-material composition having a short curing time and a good flowability to mold is used, a blade for electrophotographic apparatus can be provided which has a blade member free of surface defects such as the concave pattern caused by shrinkage non-uniformity, has a superior quality and promises a high production efficiency.

This application claims priority from Japanese Patent Application No. 2005-109747 filed on Apr. 6, 2005, which is hereby incorporated by reference herein.

What is claimed is:

1. A blade for an electrophotographic apparatus comprising a support member and joined thereto a blade member formed of a polyurethane resin, wherein:
the polyurethane resin is a resin produced by using a polyurethane raw-material composition containing at least the following components (A) to (E):
(A) a polyisocyanate;
(B) a polyol having a number average molecular weight of 2,000 or more and 4,000 or less, wherein the polyol is adipate diol;
(C) a chain extender having a molecular weight of 200 or less;
(D) a polyol having a number average molecular weight of 200 or more and 1,200 or less which is between (B) polyol and (C) chain extender, wherein the polyol is adipate diol; and
(E) a urethane curing catalyst comprising an isocyanurating catalyst,
wherein the ratio of the mass of the component (B) polyol to the mass of the component (D) polyol, (D)/(B), which components are contained in the polyurethane raw-material composition, is 0.02 or more and 0.25 or less, and
wherein the polyurethane raw-material composition has a polyisocyanate (A) group concentration (mmol/g) of 1.80 or more and 2.63 or less as calculated according to the following expression:

NCO=1,000×$F_n$×$W_{iso}$/($Mn_{iso}$×$W_{all}$)

where NCO represents the isocyanate group concentration (mmol/g);
$F_n$, the number of isocyanate groups per molecule of the component (A) polyisocyanate;
$W_{iso}$, the amount (g) in which the component (A) polyisocyanate is mixed;
$Mn_{iso}$, the number average molecular weight of the component (A) polyisocyanate; and
$W_{all}$, the total mass (g) of the components (A) to (E).

2. The blade for an electrophotographic apparatus according to claim 1, wherein the number average molecular weight of polyols for the component (B) polyol and the component (D) polyol in total is 1,500 or more and 3,000 or less.

* * * * *